(12) United States Patent
Chang-Hasnain et al.

(10) Patent No.: US 6,226,425 B1
(45) Date of Patent: May 1, 2001

(54) FLEXIBLE OPTICAL MULTIPLEXER

(75) Inventors: Constance Chang-Hasnain, Union City; Marc Schwager, Los Altos; Rang-Chen Yu, San Jose, all of CA (US)

(73) Assignee: Bandwidth9, Fremont, CA (US)

( * ) Notice: Subject to any disclaimer, the term of this patent is extended or adjusted under 35 U.S.C. 154(b) by 0 days.

(21) Appl. No.: 09/326,127

(22) Filed: Jun. 4, 1999

Related U.S. Application Data (60) Provisional application No. 60/121,456, filed on Feb. 24, 1999.

(51) Int. Cl.⁷ .............................. G02B 6/28; H04J 14/00
(52) U.S. Cl. .............................. 385/24; 385/15; 385/31; 385/42; 385/46; 359/115; 359/124
(58) Field of Search .................. 385/4, 15, 16, 385/17, 24, 31, 46, 47, 37, 42; 359/115, 117, 124, 127, 128, 130

(56) References Cited

U.S. PATENT DOCUMENTS

| | | | |
|---|---|---|---|
| H147 | 11/1986 | Feldman et al. | 357/47 |
| 4,244,045 | 1/1981 | Nosu et al. | 370/3 |
| 4,493,113 | 1/1985 | Forrest et al. | 359/115 X |
| 4,577,207 | 3/1986 | Copeland | 372/50 |
| 4,577,209 | 3/1986 | Forrest et al. | 385/88 X |
| 4,595,454 | 6/1986 | Dautremont-Smith et al. | 156/647 |
| 4,605,942 | 8/1986 | Camlibel et al. | 372/50 X |
| 4,660,208 | 4/1987 | Johnston, Jr. et al. | 372/46 |

(List continued on next page.)

FOREIGN PATENT DOCUMENTS

| | | | |
|---|---|---|---|
| 0 421 674 A2 | 4/1991 | (EP) | 372/38 X |
| 0 570 243 A1 | 11/1993 | (EP) | 385/12 X |
| 0 818 857 A1 | 1/1998 | (EP) | 372/43 X |
| 0 829 934 A1 | 3/1998 | (EP) | 372/43 X |
| 0 874 489 A2 | 10/1998 | (EP) | 385/24 X |

OTHER PUBLICATIONS

Goldstein, L. et al., "Metamorphic GaAs/AlAs Bragg deposited on InP for 1,3/1,55μm vertical cavity lasers" Centre D'Elaboration Des Materiaux Et D'Etudes Structurales.

Lambert, B. et al., High Reflectivity 1.55μm (Al)GaAsSb/AlAsSb Bragg Reactor Lattice Matched on InP Substrates; France Telecom CNET Lab/RIO ; Jul. 19, 1994.

Anan, T. et al., Improved Reflectivity of AlPSb/GaPSB Bragg Reflector for 1.55μm Wavelength; Electronics Letters; Dec. 8, 1994, vol. 30, No. 25.

Blum, O. et al., Digital Alloy AlAsSb/AlGaAsSb Distributed Bragg Reflectors Lattice Matched to InP For 1.3–1.55μm Wavelength Range; Electronics Letters; Jul. 20, 1995, vol. 31, No. 15.

(List continued on next page.)

*Primary Examiner*—Brian Healy
(74) *Attorney, Agent, or Firm*—Wilson Sonsini Goodrich & Rosati (57) ABSTRACT

A multiplexer has an optical circulator including at least first, second and third circulator ports. An optical fiber with a first optical transmission path is coupled to the first circulator port of the optical circulator. The optical fiber carries a wavelength division multiplexed optical signal, including signals $\lambda_1 - \lambda_n$, and at least one signal $\lambda_1$ to be dropped by the multiplexer. A second optical transmission path is in optical communication with the second circulator port. A first filter is coupled to the second optical transmission path. The first filter passes a portion of the $\lambda_1$ signal, and reflects a first residual $\lambda_1$ signal and signals $\lambda_2 - \lambda_n$ to the optical circulator. A third optical transmission path is in optical communication with the third circulator port and transmits the signals $\lambda_2 - \lambda_n$ received from the optical circulator.

53 Claims, 7 Drawing Sheets

U.S. PATENT DOCUMENTS

| | | | |
|---|---|---|---|
| 4,700,210 | 10/1987 | Burton et al. | 372/45 |
| 4,709,413 | 11/1987 | Forrest et al. | 359/115 X |
| 4,756,590 | 7/1988 | Forrest et al. | 359/115 X |
| 4,768,070 | 8/1988 | Takizawa et al. | 357/17 |
| 4,774,554 | 9/1988 | Dentai et al. | 372/43 X |
| 4,824,200 | 4/1989 | Isono et al. | 385/24 X |
| 4,843,280 | 6/1989 | Lumbard et al. | 313/500 |
| 4,888,624 | 12/1989 | Johnston, Jr. et al. | 372/46 X |
| 4,949,350 | 8/1990 | Jewell et al. | 372/45 |
| 4,991,179 | 2/1991 | Deppe et al. | 372/45 |
| 4,999,315 | 3/1991 | Johnston, Jr. et al. | 439/94 |
| 4,999,842 | 3/1991 | Huang et al. | 372/45 |
| 4,999,843 | 3/1991 | Luryi et al. | 372/45 |
| 5,005,935 | 4/1991 | Kunikane et al. | 385/24 X |
| 5,018,157 | 5/1991 | Deppe et al. | 372/45 |
| 5,034,344 | 7/1991 | Jewell et al. | 437/129 |
| 5,034,958 | 7/1991 | Kwon et al. | 372/45 |
| 5,063,569 | 11/1991 | Xie | 372/45 |
| 5,068,868 | 11/1991 | Deppe et al. | 372/45 |
| 5,073,041 | 12/1991 | Rastani | 385/33 |
| 5,101,460 | 3/1992 | Richard | 385/37 |
| 5,102,812 | 4/1992 | Caneau et al. | 437/32 |
| 5,104,824 | 4/1992 | Clausen et al. | 437/90 |
| 5,115,441 | 5/1992 | Kopf et al. | 372/45 |
| 5,135,605 | 8/1992 | Blonder et al. | 156/628 |
| 5,136,603 | 8/1992 | Hasnain et al. | 372/50 |
| 5,146,078 | 9/1992 | Luryi | 250/213 |
| 5,156,908 | 10/1992 | Blonder et al. | 437/129 |
| 5,164,949 | 11/1992 | Ackley et al. | 372/45 |
| 5,170,407 | 12/1992 | Schubert et al. | 372/96 |
| 5,171,704 | 12/1992 | Abernathy et al. | 437/81 |
| 5,182,787 | 1/1993 | Blonder et al. | 385/131 |
| 5,206,526 | 4/1993 | Liu et al. | 257/185 |
| 5,206,871 | 4/1993 | Deppe et al. | 372/45 |
| 5,206,872 | 4/1993 | Jewell et al. | 372/46 |
| 5,212,701 | 5/1993 | Choquette et al. | 372/45 |
| 5,212,702 | 5/1993 | Choquette | 372/45 |
| 5,216,686 | 6/1993 | Holm et al. | 372/45 |
| 5,216,727 | 6/1993 | Vakhshoori et al. | 385/14 |
| 5,223,723 | 6/1993 | Luryi | 257/184 |
| 5,226,053 | 7/1993 | Cho et al. | 372/45 |
| 5,227,006 | 7/1993 | Abernathy et al. | 156/613 |
| 5,227,648 | 7/1993 | Woo | 257/185 |
| 5,244,749 | 9/1993 | Bean et al. | 428/620 |
| 5,258,316 | 11/1993 | Ackley et al. | 437/24 |
| 5,262,360 | 11/1993 | Holonyak, Jr. et al. | 437/237 |
| 5,281,542 | 1/1994 | Hui et al. | 437/2 |
| 5,288,657 | 2/1994 | Feygenson et al. | 437/90 |
| 5,291,502 | 3/1994 | Pezeshki et al. | 372/20 |
| 5,311,526 | 5/1994 | Gorfinkel et al. | 372/26 |
| 5,314,838 | 5/1994 | Cho et al. | 437/105 |
| 5,316,968 | 5/1994 | Choquette | 437/105 |
| 5,317,587 | 5/1994 | Ackley et al. | 372/45 |
| 5,323,416 | 6/1994 | Bhat et al. | 372/99 |
| 5,328,854 | 7/1994 | Vakhshoori et al. | 437/24 |
| 5,331,658 | 7/1994 | Shieh et al. | 372/50 |
| 5,337,327 | 8/1994 | Ackley et al. | 372/45 |
| 5,343,490 | 8/1994 | McCall | 372/94 |
| 5,348,912 | 9/1994 | Choquette et al. | 437/129 |
| 5,351,257 | 9/1994 | Lebby et al. | 372/48 |
| 5,351,261 | 9/1994 | Lanzerotti et al. | 372/98 |
| 5,351,262 | 9/1994 | Poguntke et al. | 372/102 |
| 5,355,385 | 10/1994 | Amano et al. | 372/49 |
| 5,362,977 | 11/1994 | Hunt et al. | 257/98 |
| 5,387,543 | 2/1995 | Ackley | 437/129 |
| 5,418,183 | 5/1995 | Joyner et al. | 437/129 |
| 5,446,752 | 8/1995 | Ackley et al. | 372/46 |
| 5,457,760 | 10/1995 | Mizrahi | 385/37 |
| 5,493,577 | 2/1996 | Choquette et al. | 372/46 |
| 5,495,360 | 2/1996 | Yoo | 359/248 |
| 5,498,883 | 3/1996 | Lebby et al. | 257/95 |
| 5,574,744 | 11/1996 | Gaw et al. | 372/50 |
| 5,608,825 | 3/1997 | Ip | 385/24 |
| 5,614,436 | 3/1997 | Shim et al. | 437/129 |
| 5,619,609 | 4/1997 | Pan et al. | 385/136 |
| 5,629,951 | 5/1997 | Chang-Hasnain et al. | 372/20 |
| 5,638,392 | 6/1997 | Ramdani et al. | 372/45 |
| 5,659,640 | 8/1997 | Joyner | 385/14 |
| 5,661,075 | 8/1997 | Grodzinski et al. | 438/32 |
| 5,677,924 | 10/1997 | Bestwick | 372/96 |
| 5,696,023 | 12/1997 | Holonyak et al. | 437/133 |
| 5,719,891 | 2/1998 | Jewell | 372/45 |
| 5,719,893 | 2/1998 | Jiang et al. | 372/45 |
| 5,737,104 | 4/1998 | Lee et al. | 359/124 |
| 5,742,416 * | 4/1998 | Mizrahi | 359/134 |
| 5,742,630 | 4/1998 | Jiang et al. | 372/50 |
| 5,748,349 | 5/1998 | Mizrahi | 359/130 |
| 5,748,350 | 5/1998 | Pan et al. | 359/130 |
| 5,751,757 | 5/1998 | Jiang et al. | 372/50 |
| 5,757,836 | 5/1998 | Jiang et al. | 372/50 |
| 5,760,419 | 6/1998 | Nabiev et al. | 237/21 |
| 5,764,671 | 6/1998 | Lebby et al. | 372/45 |
| 5,764,679 | 6/1998 | Shen et al. | 372/69 |
| 5,805,624 | 9/1998 | Yang et al. | 372/45 |
| 5,812,577 | 9/1998 | Dawson et al. | 372/46 |
| 5,825,520 * | 10/1998 | Huber | 359/130 |
| 5,841,918 * | 11/1998 | Li | 385/24 |
| 5,903,586 | 5/1999 | Ramdani et al. | 372/45 |
| 5,909,295 * | 6/1999 | Li et al. | 359/130 |
| 5,926,300 * | 7/1999 | Miyakawa et al. | 359/124 |
| 5,940,551 * | 8/1999 | Oberg | 385/17 |
| 5,978,408 | 11/1999 | Thornton | 372/96 |
| 6,041,152 * | 3/2000 | Clark | 385/24 |
| 6,067,389 * | 5/2000 | Fatehi et al. | 385/17 |
| 6,097,861 * | 8/2000 | Kim et al. | 385/27 |

OTHER PUBLICATIONS

Yamashita, S. et al., "A Polarization–Independent Local Node Construction for Optical WDM Ring Networks Using a Centralized Multiwavelength Light Source", *IEICE Trans. Commun.*, vol. E81–8, No. 11, Nov. 1998, pp. 2168–2174.

Mikio, Y., "Circuit for Stabilizing Oscillating Wavelength of Laser Diode", Patent Abstracts of Japan, vol. 014, No. 163, Mar. 29, 1990, (JP02020084).

Ishii, H. et al., "Wavelength stabilization of a three–electrode distributed Bragg reflector laser with longitudinal mode control", Electronics Letters, vol. 33, No. 6, Mar. 13, 1997, pp. 494–496.

* cited by examiner

FLEXIBLE OPTICAL MULTIPLEXER

CROSS-REFERENCE TO RELATED APPLICATION

The present invention is a continuation-in-part of provisional application Ser. No. 60/121,456, filed Feb. 24, 1999, pending, which is incorporated by reference herein.

BACKGROUND OF THE INVENTION

1. Field of the Invention

This invention relates generally to optical multiplexers, and more particularly to wavelength selectable optical multiplexers and de-multiplexers.

2. Description of Related Art

Optical communication systems are a substantial and fast-growing constituent of communication networks. As used herein, an optical communication system, relates to any system which uses optical signals to convey information across an optical waveguiding medium. Such optical systems include, but are not limited to, telecommunications systems, cable television systems, and local area networks (LANs). Optical systems are described in Gowar, Ed. Optical Communication Systems, (Prentice Hall, N.Y.) c. 1993, the disclosure of which is incorporated herein by reference. Currently, the majority of optical communication systems are configured to carry an optical channel of a single wavelength over one or more optical waveguides. To convey information from plural sources, time-division multiplexing is frequently employed (TDM). In time-division multiplexing, a particular time slot is assigned to each information source, the complete signal being constructed from the signal portion collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded, e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. A WDM system employs plural optical signal channels, each channel being assigned a particular channel wavelength. In a WDM system, optical signal channels are generated, multiplexed to form an optical signal comprised of the individual optical signal channels, transmitted over a single waveguide, and de-multiplexed such that each channel wavelength is individually routed to a designated receiver. Through the use of optical amplifiers, such as doped fiber amplifiers, plural optical channels are directly amplified simultaneously, facilitating the use of WDM systems in long-distance optical systems. Exemplary WDM optical communication systems are described in commonly-assigned U.S. Pat. Nos. 5,504,609, 5,532,864, and 5,557,442, the disclosures of which are incorporated herein by reference.

In many applications, such as optical LANs, cable television subscriber systems, and telecommunications networks, there is a need to route one or more channels of a multiplexed optical signal to different destinations. Such routing occurs when optical channels are sent to or withdrawn from an optical transmission line e.g., for sending optical channels between a terminal and an optical bus or routing long distance telecommunications traffic to individual cities. This form of optical routing is generally referred to as optical add-drop multiplexing.

The most prevalent device used for combining and extracting wavelengths in a DWDM system is an Array Waveguide (AWG). The AWG suffers from an undesirable side effect that requires each port transmit, or receive in the case of a de-multiplexer, only one specific, pre-determined wavelength and sequential wavelengths. This is problematic in the case that one of the transmitters fails. A new transmitter of the identical wavelength must be added to that specific port. A second multiplexer design uses couplers that have the unpleasant side effect of adding $-10\log N$ to $3\log_2 N$ dB of loss at each stage of coupling.

There is a need for a DWDM device, sub-system and system with flexibility in design, configuration and degree of system refinement. There is another need for multiplexing that frees transmitters to use any port. A further need exists for flexible construction of multiplexers and de-multiplexers using different circulator port counts and interchangeable device types. There is a further need for the use of variable tunable filters working in concert to tailor a DWDM signal for gain flatness as well as other applications. Another need exists for DWDM devices, sub-systems and systems with low cross-talk.

SUMMARY OF THE INVENTION

An object of the present invention is to provide a DWDM device, sub-system or system that provides improved flexibility in design, configuration and system refinement.

Another object of the present invention is to provide a DWDM device, sub-system or system that is tunable.

Yet another object of the present invention is to provide a DWDM device, sub-system or system that is programmably tunable.

A further object of the present invention is to provide a DWDM device, sub-system or system that is flexible and provides for different configuration, different levels of filtration as well as different combinations of wavelengths that are multiplexed and de-multiplexed.

Still another object of the present invention is to provide a tunable DWDM device with one or more filters to reduce crosstalk.

Another object of the present invention is to provide a position independent method and device for combining or separing many wavelengths into or from a single optical fiber.

Yet another object of the invention is to provide a wavelength tunable variable optical tap.

Another object of the invention is to provide a drop and continue network node.

These and other objects of the invention are provided in a multiplexer with an optical circulator including at least first, second and third circulator ports. An optical fiber with a first optical transmission path is coupled to the first circulator port of the optical circulator. The optical fiber carries a wavelength division multiplexed optical signal, including signals $\lambda_1-\lambda_n$, and at least one signal $\lambda_1$ to be dropped by the multiplexer. A second optical transmission path is in optical communication with the second circulator port. A first filter is coupled to the second optical transmission path. The first filter passes a portion of the $\lambda_1$ signal, and reflects a first residual $\lambda_1$ signal and signals $\lambda_2-\lambda_n$ to the optical circulator. A third optical transmission path is in optical communication with the third circulator port and transmits the signals $\lambda_2-\lambda_n$ received from the optical circulator.

In another embodiment, a multiplexer for a wavelength division multiplexed optical communication system has an optical circulator with at least first, second, third and fourth circulator ports. An optical fiber with a first optical transmission path is coupled to the first circulator port and carries a wavelength division multiplexed optical signal including signals $\lambda_1$–$\lambda_n$. A second optical transmission path is in optical communication with the second circulator port. A first detector/filter is coupled to the second optical transmission path. The first detector/filter detects a $\lambda_1$ signal, passes a portion of the $\lambda_1$ signal, and reflects a first residual $\lambda_1$ signal and the signals $\lambda_2$–$\lambda_n$ to the optical circulator. A third optical transmission path is in optical communication with the third circulator port and transmits the signals $\lambda_1$–$\lambda_n$ received from the optical circulator. A fourth optical transmission path is in optical communication with the fourth optical circulator port. The fourth optical transmission path is positioned after the second optical transmission path and before the third optical transmission path. A first optoelectronic device is coupled to the fourth optical transmission path.

In another embodiment, a first filter is substituted for the first detector/filter. The first filter does not detect the $\lambda_1$ signal. The first filter passes a portion of the $\lambda_1$ signal, and reflecting the first residual $\lambda_1$ signal and the signals $\lambda_2$–$\lambda_n$ to the optical circulator.

DETAILED DESCRIPTION

Figure 1:
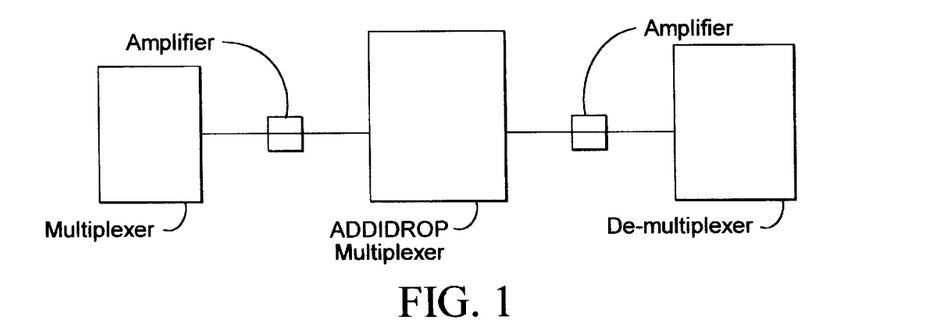
FIG. 1 is a schematic diagram of an embodiment of the present invention illustrating a DWDM system.

The present invention provides DWDM systems, sub-systems and devices. The present invention is applicable to coarse or wide wavelength-division multiplexing. Sub-systems of the present invention include but are not limited to multiplexers, de-multiplexers, add/drop multiplexers, gain flatteners, taps and filters. In one embodiment illustrated in FIG. 1, a DWDM system 10 includes a multiplexer, a de-multiplexer and a DWDM sub-system that is coupled to the multiplexer and the de-multiplexer. Also included are one or more amplifiers. The DWDM systems, sub-systems and devices of the present invention provide improved flexibility of wavelength adding, combining, dropping, separating and leveling. The DWDM devices, sub-systems and systems of the present invention permit different system and sub-system, (i) configurations, (ii) levels of signal filtration and (ii) combinations of signals that are multiplexed and de-multiplexed.

In one embodiment of the present invention, the DWDM systems, sub-systems and devices have low cross talk that is better than 20 dB. It will be appreciated that the present invention is not limited to cross talk that is better than 20 dB.

Figure 2:
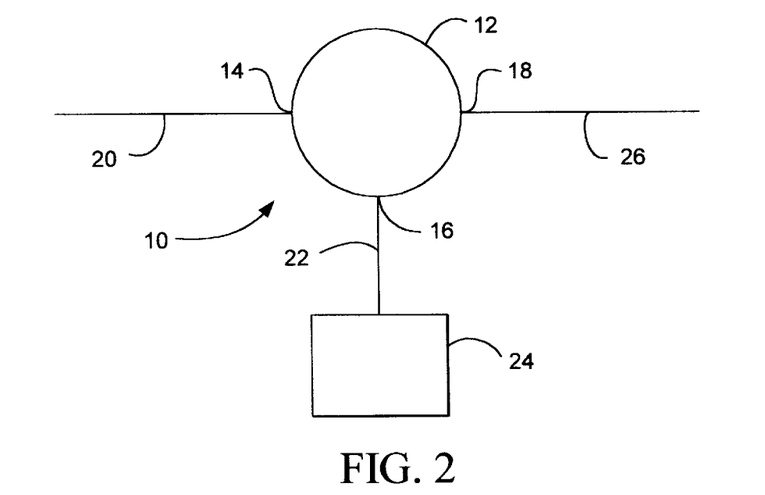
FIG. 2 is a schematic diagram of multiplexer or de-multiplexer of the present invention that includes a three port optical circulator and a filter that is reflective and transmissive coupled to the optical circulator.

Referring now to FIG. 2, one embodiment of the invention is a multiplexer 10 that includes an optical circulator 12 with at least first, second and third circulator ports 14, 16 and 18 respectively. Multiplexer 10 can includes any number of circulator ports. An optical fiber with a first optical transmission path 20 is coupled to first circulator port 14. The optical fiber carries a wavelength division multiplexed optical signal, including signals $\lambda_1$–$\lambda_n$, and at least one signal $\lambda_1$ to be dropped by multiplexer 10. The signal $\lambda_1$ can be any of the signals $\lambda_1$–$\lambda_n$. A second optical transmission path 22 is in optical communication with second circulator port 16. A first filter 24 is coupled to second optical transmission path 22. Filter 24 is transmissive in one or more signals and reflective of all other signals, has a high degree of reflectivity, works well across the entire DWDM spectrum and has minimal gain slope. Filter 24 passes a portion of the $\lambda_1$ signal, and reflects a first residual $\lambda_1$ signal and signals $\lambda_2$–$\lambda_n$ to optical circulator 12. A third optical transmission path 26 is in optical communication with third circulator port 18 and transmits the signals $\lambda_2$–$\lambda_n$ received from the optical circulator. Filter 24 reduces the cross-talk of multiplexer 10. In one embodiment, one detector and at least two filters 24 bring down the cross talk to 50 dB, and more preferably 45 dB.

Figure 3:
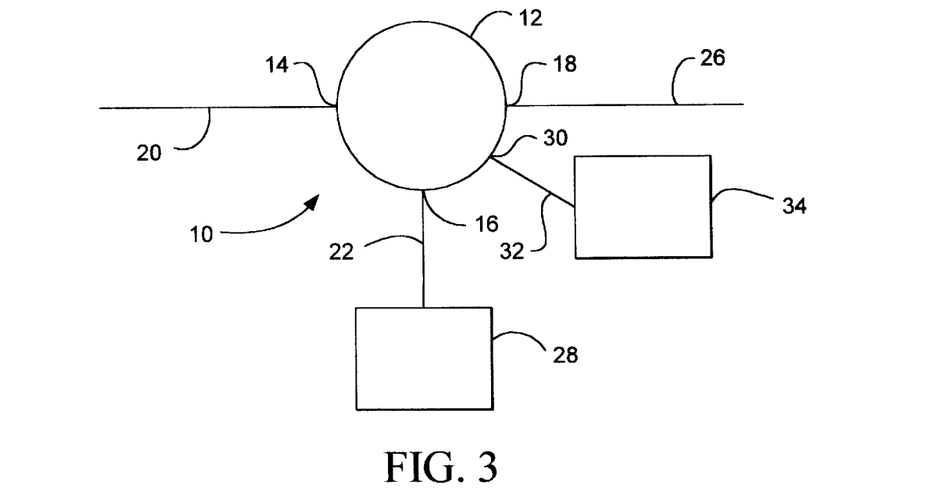
FIG. 3 is a schematic diagram of multiplexer or de-multiplexer that includes a four port optical circulator and a detector/filter that detects and passes a portion of a signal, reflects a residual portion of the passed signal along with all other signals, as well as a second optoelectronic device coupled to the optical circulator.

Another embodiment of a multiplexer 10 of the present invention is illustrated in FIG. 3. Optical circulator has four optical circulator ports 14, 16, 18 and 30. A detector/filter 28 is coupled to second optical transmission path 22. Detector/filter combines the two functions of detection and filtering and is typically an integrated device. Detector/filter 28 detects the $\lambda_1$ signal, passing a portion of the $\lambda_1$ signal, and reflects a first residual $\lambda_1$ signal and signals $\lambda_2$–$\lambda_n$ to optical circulator 12. Preferably, a majority of the signal $\lambda_1$ is passed. Preferably, at least 95% of the signal $\lambda_1$ is passed, and more preferably 99%. Detector/filter 28 can be an integral or a non-integral detector and filter device. Fourth optical transmission path 32 is positioned between second and third optical transmission paths 22 and 26. An optoelectronic device 34 is coupled to fourth optical transmission path 32. In this embodiment, multiplexer 10 is an optical tap, add-drop multiplexer or gain/loss equalization device.

Optoelectronic device 34 can be a detector/filter, a filter or a laser. Suitable lasers and laser assemblies are disclosed in U.S. Patent Applications, Attorney Docket Nos. 21123-701, 21123-702, 21123-703, filed on the same date of this application and incorporated herein by reference. When optoelectronic device 34 is a detector/filter or a filter, multiplexer 12 is an optical drop or gain equalization device. When optoelectronic device 34 is a laser, multiplexer 12 is an add-drop multiplexer. Detector/filter 34 detects the first residual $\lambda_1$ signal, passes the first residual $\lambda_1$ signal and reflects a second residual $\lambda_1$ signal and the signals $\lambda_2$–$\lambda_n$ which are received at optical circulator 12. The second residual $\lambda_1$ signal has a few percent, preferably 5% or less, of the original first residual $\lambda_1$ signal, and more preferably only 0.1%. Filter 34 does not detect the signal $\lambda_1$. Filter 34 passes the first residual $\lambda_1$ signal and reflects the second residual $\lambda_1$ signal and the signals $\lambda_2$–$\lambda_n$ which are again received at optical circulator 12. Laser 34 reflects the first residual $\lambda_1$ signal and the signals $\lambda_2$–$\lambda_n$ and adds back the signal $\lambda_1$. Laser 34 preferably is a laser emitting an ITU grid wavelength with a front face with high reflectivity (up to 99%) to incident wavelengths other than the lasing wavelength. Instead of adding back the signal $\lambda_1$ laser 34 can add a new signal, the $\lambda_{n+1}$ signal.

Figure 4:
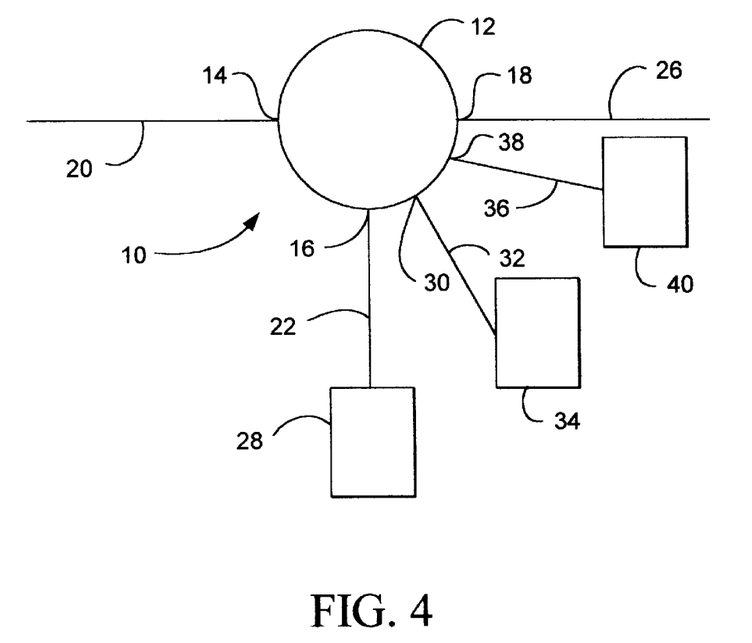
FIG. 4 is a schematic diagram of the multiplexer or de-multiplexer of FIG. 3 with an additional optical circulator port, optical transmission path and a third optoelectronic device.

Referring now to FIG. 4, multiplexer 10 can further include a fifth optical transmission path 36 in optical communication with a third optical circulator port 38. Fifth optical transmission path 36 is positioned between fourth and fifth optical transmission paths 32 and 26 respectively. A second optoelectronic device 40 is coupled to fifth optical transmission path 36. Second optoelectronic device 40 can be a detector/filter, filter or laser. In the embodiment of FIG. 4, detector/filter 28 is coupled to second optical transmission path 22. One of detector/filter 34, filter 34 or laser 34 is coupled to fourth optical transmission path 32.

In FIG. 4, when detector/filter 34 is coupled to fourth optical transmission path 32, detector/filter 40 detects the second residual $\lambda_1$ signal, passes the second residual $\lambda_1$ signal and reflects a third residual $\lambda_1$ signal and the signals $\lambda_2$–$\lambda_n$ which are received at optical circulator 12. Filter 40 passes the second residual $\lambda_1$ signal and reflects the third residual $\lambda_1$ signal and the signals $\lambda_2$–$\lambda_n$ which are again received at optical circulator 12. In this embodiment, multiplexer 12 is an optical drop, add-drop multiplexer or gain/loss equalization device. Laser 40 reflects the second residual $\lambda_1$ signal and the signals $\lambda_2$–$\lambda_n$, and either adds back the signal $\lambda_1$ or adds a new $\lambda_{n+1}$ signal. In this embodiment, multiplexer 12 is an add-drop multiplexer.

Further in FIG. 4, when laser 34 is coupled to fourth optical transmission path, detector/filter 40 detects the first residual $\lambda_1$ signal, passes the first residual $\lambda_1$ signal and reflects a second residual $\lambda_1$ signal, the signals $\lambda_2$–$\lambda_n$ and the signal $\lambda_{n+1}$. Filter 40 passes the first residual $\lambda_1$ signal and reflects a second residual $\lambda_1$ signal, the signals $\lambda_2$–$\lambda_n$ and the signal $\lambda_{n+1}$. Laser 40 reflects the first residual $\lambda_1$ signal, the signals $\lambda_2$–$\lambda_n$, the signal $\lambda_{n+1}$ and adds back the signal $\lambda_1$ or adds a new signal $\lambda_{n+2}$.

Figure 5:
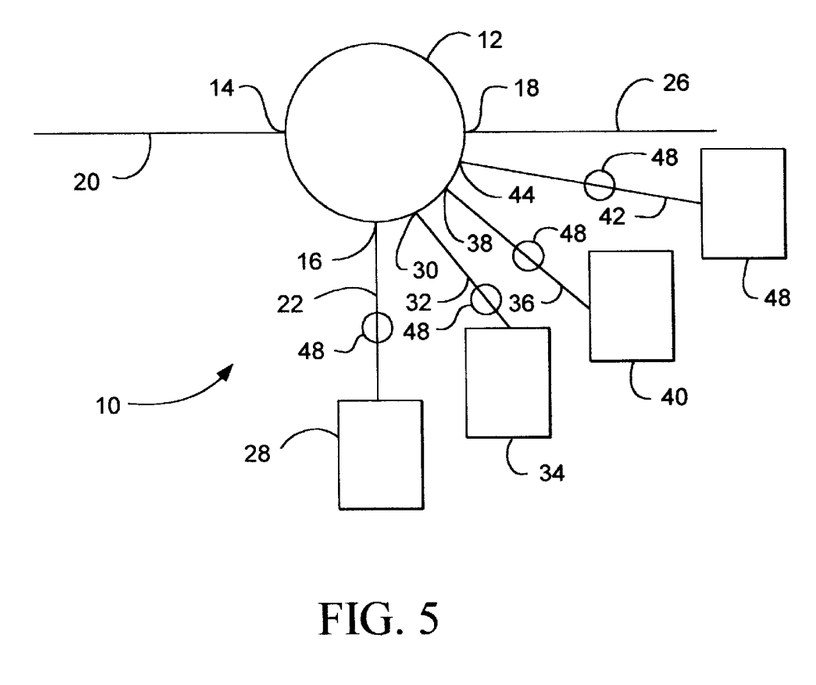
FIG. 5 is a schematic diagram of the multiplexer or de-multiplexer of FIG. 4 with an additional optical circulator port, optical transmission path and a fourth optoelectronic device.

As shown in FIG. 5, a sixth optical transmission path 42 is in optical communication with a sixth optical circulator port 44. Sixth optical transmission path 42 is positioned after between fifth and third optical transmission paths 36 and 26. An optoelectronic device 46 is coupled to sixth optical transmission path 42. Optoelectronic device 46 can be a detector/filter, filter or laser.

In FIG. 5, when detector/filter 34 or filter 34 is coupled to fourth optical transmission path 32, and detector/filter 40 or filter 40 is coupled to fifth optical transmission path 36, laser 46 reflects the third residual $\lambda_1$ signal, the signals $\lambda_2$–$\lambda_n$ and adds back the signal $\lambda_1$ or adds the new signal $\lambda_{n+1}$.

In each of FIGS. 2–5, a bidirectional optical amplifier 48 can be coupled to any of the second, third, fourth, fifth or sixth optical transmission paths 22, 32, 36 and 42 respectively, and positioned between the optoelectronic device and optical circulator 12. Bi-directional optical amplifier 48 has low noise, flat gain and is able to handle the entire DWDM signal range. Additionally, some or all of detector/filter, filter, bidirectional amplifier and laser 28, 34, 40 and 48 can be programmably or non-programmably tunable.

Figure 6:
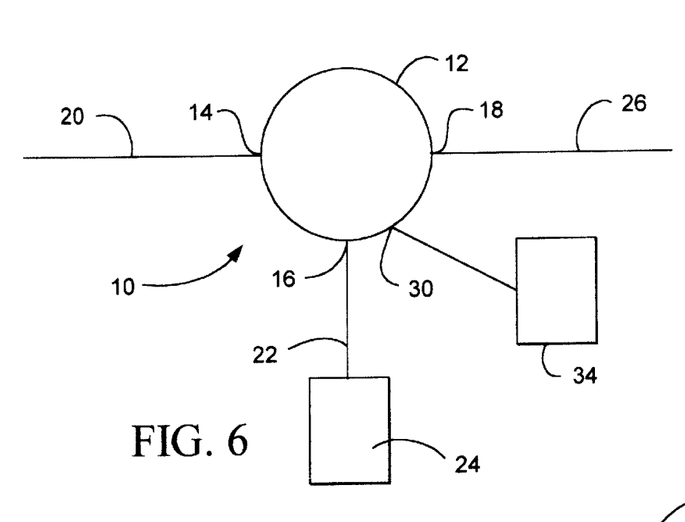
FIG. 6 is a schematic diagram of multiplexer or de-multiplexer that includes a four port optical circulator and a filter that passes a portion of a signal, reflects a residual portion of the passed signal along with all other signals, as well as a second optoelectronic device coupled to the optical circulator.

In the embodiment illustrated in FIG. 6, filter 24 is coupled to second optical transmission path 22. Filter 24 passes a majority of the signal $\lambda_1$ and reflects the first residual $\lambda_1$ signal and signals $\lambda_2$–$\lambda_n$ to optical circulator 12. An optoelectronic device 34 is coupled to fourth optical transmission path 30. Optoelectronic device 34 can be a filter, detector/filter, laser amplifier or attenuator.

When optoelectronic device 34 is a filter, multiplexer 10 is an optical tap, optical drop or gain/loss equalization device. Filter 34 passes the first residual $\lambda_1$ signal and reflects the second residual $\lambda_1$ signal and the signals $\lambda_2$–$\lambda_n$ which are again received at optical circulator 12. When optoelectronic device 34 is a detector/filter, multiplexer 12 is an optical drop or gain equalization device. Detector/filter 34 detects the first residual $\lambda_1$ signal, passes the first residual $\lambda_1$ signal and reflects a second residual $\lambda_1$ signal and the signals $\lambda_2$–$\lambda_n$ which are received at optical circulator 12. When optoelectronic device 34 is a laser, multiplexer 12 is an add-drop multiplexer. Laser 34 adds back the signal $\lambda_1$ or adds a new signal, the $\lambda_{n+1}$ signal.

Figure 7:
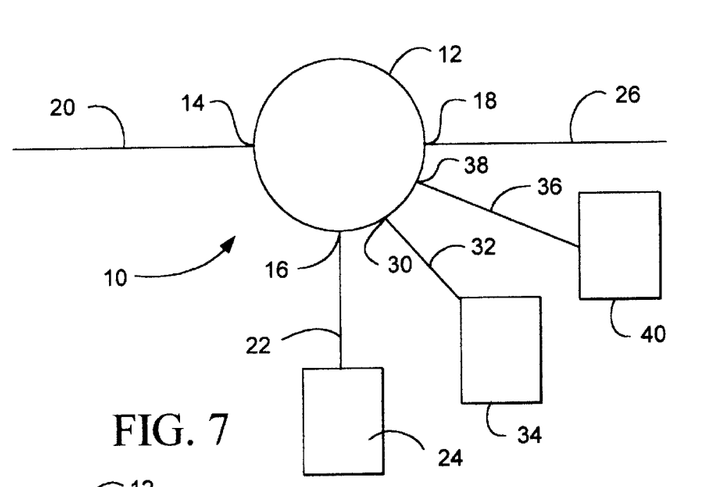
FIG. 7 is a schematic diagram of the multiplexer or de-multiplexer of FIG. 6 with an additional optical circulator port, optical transmission path and a third optoelectronic device.

Referring now to FIG. 7, multiplexer 10 of FIG. 6 can further include second optoelectronic device 40 coupled to fifth optical transmission path 36. Second optoelectronic device 40 can be a detector/filter, filter, laser amplifier or attenuator. Multiplexer 12 is an optical tap, optical drop, add-drop multiplexer or gain equalization device when second optoelectronic device is filter 40; an optical drop, gain equalization device, add-drop multiplexer or optical tap when second optoelectronic device is detector/filter 40; and an add-drop multiplexer when second optoelectronic device 40 is laser 40.

In FIG. 7, when detector/filter 34 or filter 34 are coupled to fourth optical transmission path 32, detector/filter 40 detects the second residual $\lambda_1$ signal, passes the second residual $\lambda_1$ signal and reflects a third residual $\lambda_1$ signal and the signals $\lambda_2$–$\lambda_n$ which are received at optical circulator 12. Filter 40 passes the second residual $\lambda_1$ signal and reflects the third residual $\lambda_1$ signal and the signals $\lambda_2$–$\lambda_n$ which are again received at optical circulator 12. Laser 40 reflects the second residual $\lambda_1$ signal and the signals $\lambda_2$–$\lambda_n$, and either adds back the signal $\lambda_1$ or adds a new $\lambda_{n+1}$ signal.

Further in FIG. 7, when laser 34 is coupled to fourth optical transmission path, detector/filter 40 detects the first residual $\lambda_1$ signal, passes the first residual $\lambda_1$ signal and reflects a second residual $\lambda_1$ signal, the signals $\lambda_2$–$\lambda_n$ and the signal $\lambda_{n+1}$. Filter 40 passes the first residual $\lambda_1$ signal and reflects a second residual $\lambda_1$ signal, the signals $\lambda_2$–$\lambda_n$ and the signal $\lambda_{n+1}$. Laser 40 reflects the first residual $\lambda_1$ signal, the signals $\lambda_2$–$\lambda_n$ the signal $\lambda_{n+1}$ and adds back the signal $\lambda_1$ or adds a new signal $\lambda_{n+2}$.

Figure 8:
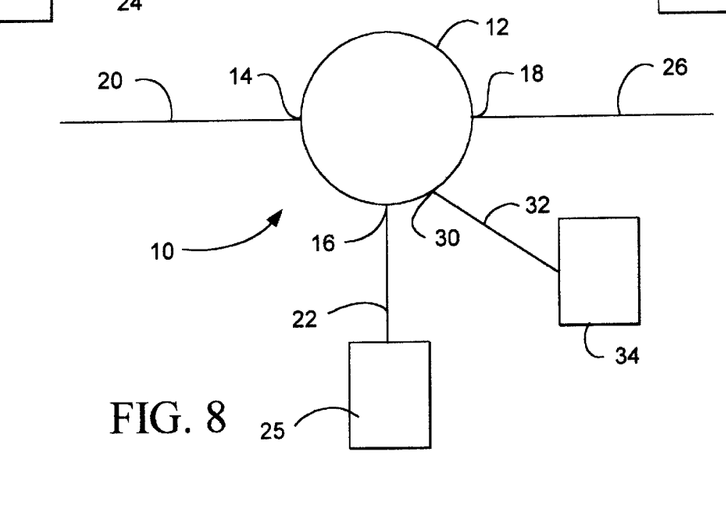
FIG. 8 is a schematic diagram of a multiplexer or de-multiplexer of the present invention that includes a four port optical circulator, a laser coupled to the second port and an optoelectronic device coupled to the fourth port.

In the embodiment illustrated in FIG. 8, a laser 25 is coupled to second optical transmission path 22. Laser 25 reflects the signals $\lambda_1$–$\lambda_n$ and adds a signal $\lambda_{n+1}$. An optoelectronic device 34 is coupled to fourth optical transmission path 30. Optoelectronic device 34 can be a filter, detector/filter or laser and multiplexer 12 is an add-drop multiplexer or an optical add.

In FIG. 8, when optoelectronic device 34 is a detector/filter 34, detector/filter 34 passes the first residual $\lambda_1$ signal and reflects the second residual $\lambda_1$ signal, the signals $\lambda_2$–$\lambda_n$ and the signal $\lambda_{n+1}$ which are again received at optical circulator 12. Laser 34 reflects the signal $\lambda_1$–$\lambda_n$, the signal $\lambda_{n+1}$ and adds the $\lambda_{n+1}$ signal, all of which are directed to optical circulator 12.

Figure 9:
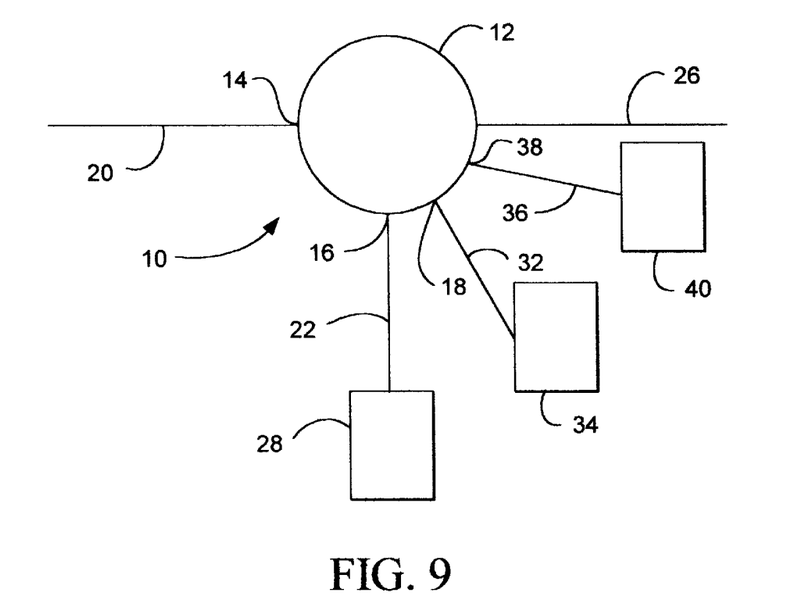
FIG. 9 is a schematic diagram of the multiplexer or de-multiplexer of FIG. 8 with a second optoelectronic device coupled to an additional optical circulator port.

In FIG. 9, multiplexer 10 of FIG. 6 further includes second optoelectronic device 40 coupled to fifth optical transmission path 36. Second optoelectronic device 40 can be a detector/filter, filter or laser. When second optoelectronic device is a laser, Laser 40 reflects signals $\lambda_1$–$\lambda_n$, signal $\lambda_{n+1}$, and signal $\lambda_{n+2}$ and adds a signal $\lambda_{n+3}$. Third optical transmission path 26 transmits signals $\lambda_1$–$\lambda_n$, signal $\lambda_{n+1}$, the $\lambda_{n+2}$ signal and signal $\lambda_{n+3}$.

Figure 10:
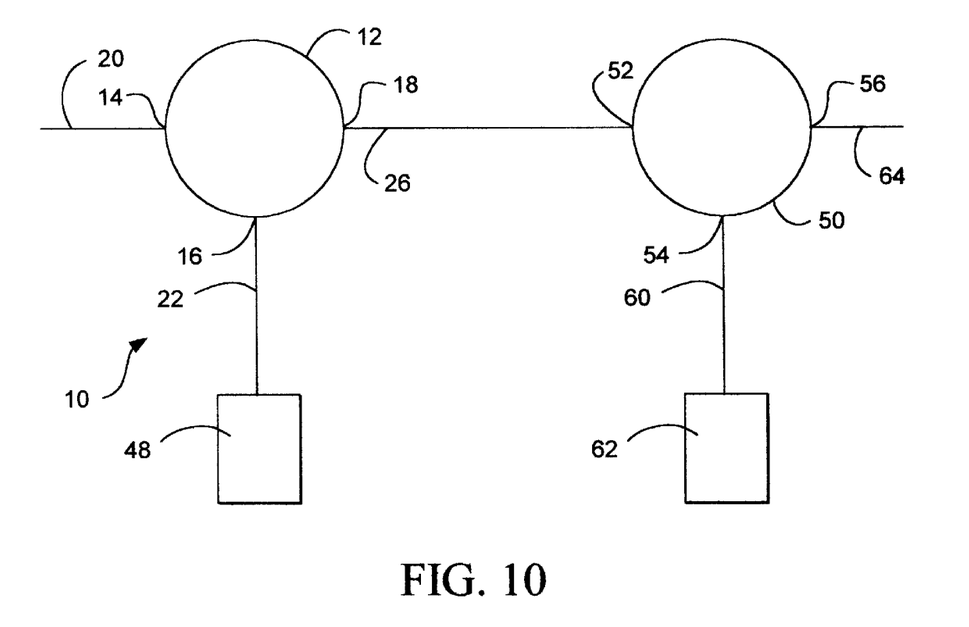
FIG. 10 is a schematic diagram of a multiplexer or de-multiplexer of the present invention with two optical circulators and an optoelectronic device coupled to each optical circulator.

Multiple optical circulators are also used with the present invention. As illustrated in FIG. 10, multiplexer 10 includes optical circulator 12 with at least first, second and third circulator ports 14, 16 and 18, and an optical fiber, carrying signals $\lambda_1$–$\lambda_n$, with a first optical transmission path 20 coupled to first circulator port 14. Second optical transmission path 22 is in optical communication with second circulator port 16. An optoelectronic device 48 is in optical communication with second optical transmission path. A second optical circulator 50 has at least a first, second and third circulator ports 52, 54 and 56 respectively. Third optical transmission path 26 is in optical communication with third circulator port 18 and first circulator port 52. A fourth optical transmission path 60 is in optical communication with second circulator port 54. A second optoelectronic device 62 is in optical communication with fourth optical transmission path 60. A fifth optical transmission path 64 is in optical communication with third circulator port 56. Optoelectronic devices 48 and 62 can be a detector/filter, filter, laser amplifier or attenuator.

In one embodiment, multiplexer 10 is an add-add multiplexer where optoelectronic devices 48 and 62 are lasers 48 and 62. Laser 48 adds the signal $\lambda_{n+1}$. Laser 62 adds the signal $\lambda_{n+2}$. Signals $\lambda_1$–$\lambda_n$, signal $\lambda_{n+1}$ and signal $\lambda_{n+2}$ are transmitted at fifth optical transmission path 64. Signals $\lambda_{n+1}$ and $\lambda_{n+2}$ do not have any particular pre-defined wavelength separation from $\lambda_1$ to $\lambda_n$+. In this configuration wavelengths of arbitrary relationship to $\lambda_1$ to $\lambda_n$ can be flexibly added.

In another embodiment, multiplexer 10 is an add-add multiplexer where optoelectronic devices 48 and 62 are laser 48 and detector/filter 62. Detector/filter 62 detects and passes the signal $\lambda_1$ and reflects the signals $\lambda_2$–$\lambda_n$ and signal $\lambda_{n+1}$. Filter 62 can be substituted for the detector/filter. Filter 62 passes but does not detect the signal $\lambda_1$ and reflects the signals $\lambda_2$–$\lambda_n$ and signal $\lambda_{n+1}$.

Multiplexer 10 of FIG. 10 can include any number of different combinations of optoelectronic devices to produce a multi-drop multiplexer with low cross-talk. Suitable combinations include but are not limited to detector/filter 48 and detector/filter 62, detector/filter 48 and filter 62, filter 48 and detector/filter 62 as well as filter 48 and filter 62.

Figure 11:
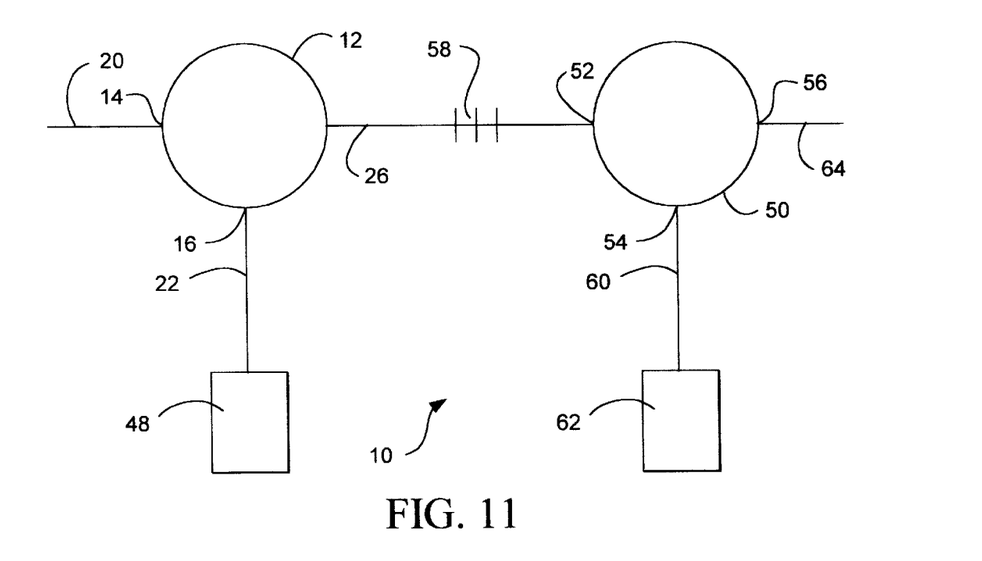
FIG. 11 is a schematic diagram of the multiplexer or de-multiplexer of FIG. 10 that includes a residual filter positioned between the first and second optical circulators.

Referring now to FIG. 11, a rejection filter 58 can be used with the multiplexer of FIG. 10. Rejection filter 58 is coupled to third optical transmission path 26. In this embodiment, multiplexer 10 is an add-drop or a optical drop multiplexer, and optoelectronic device 48 can be a detector/filter or filter, and optoelectronic device 62 can be a detector/filter, filter or laser.

Figure 12:
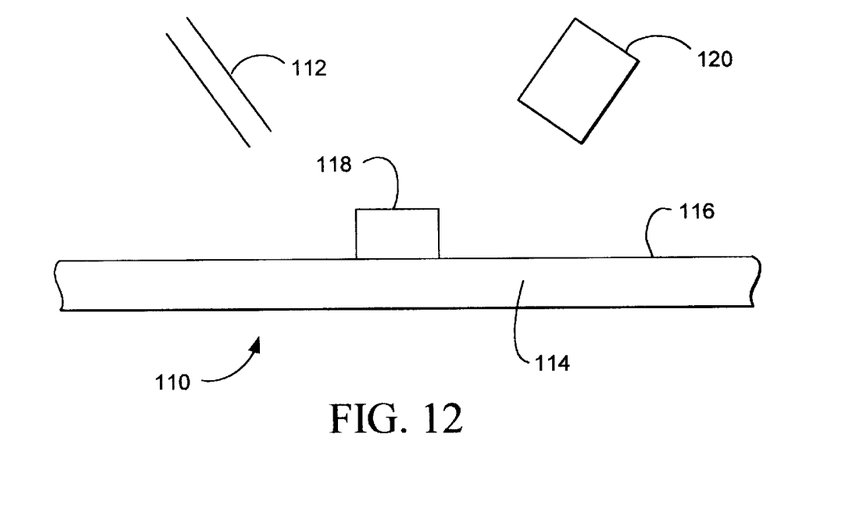
FIG. 12 is a schematic diagram of a multiplex or de-multiplexer of the present invention with an input fiber, a substrate, a first optoelectronic device positioned on a surface of the substrate and a second optoelectronic device.

In other embodiments, a de-multiplexer is provided. Referring now to FIG. 12, a de-multiplexer 110 includes an input fiber 112 carrying signals $\lambda_1$–$\lambda_n$. A first substrate 114 has a first mount surface 116. A first optoelectronic device 118 is positioned at first mount surface 116. First optoelectronic device 118 can be a detector/filter or a filter. A second optoelectronic device 120 is positioned to receive an output from first optoelectronic device 118. Second optoelectronic device 120 can be a detector/filter, a filter or a mirror.

In FIG. 12, when optoelectronic device 118 is a detector/filter or filter, detector/filter 118 and filter 118 each pass a portion of signal $\lambda_1$, and reflect a first residual $\lambda_1$ signal and signals $\lambda_2$–$\lambda_n$. When optoelectronic device 120 is a detector/filter or filter, detector/filter 120 and filter 120 each pass the first residual $\lambda_1$ signal, and reflect second residual $\lambda_1$ signal and signals $\lambda_2$–$\lambda_n$. When optoelectronic device 112 is a detector/filter or a filter, and optoelectronic device 120 is a mirror, mirror 120 reflects first residual $\lambda_1$ signal and signals $\lambda_2$–$\lambda_n$ back to detector/filter or filter 118 which then reflects the second residual $\lambda_1$ signal and signals $\lambda_2$–$\lambda_n$ back to input fiber 112.

Figure 13:
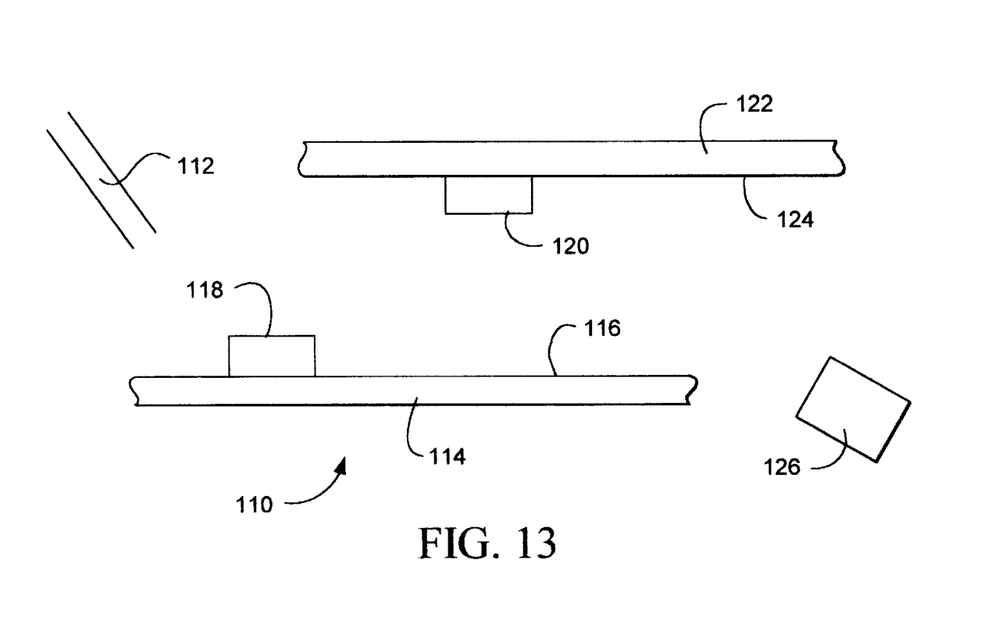
FIG. 13 is a schematic diagram of a multiplex or de-multiplexer of the present invention with an input fiber, a first substrate, a second substrate that faces the first substrate, a first optoelectronic device positioned on a surface of the first substrate, a second optoelectronic device positioned at a surface of the second substrate and a third optoelectronic device.

As illustrated in FIG. 13, de-multiplexer 110 includes input fiber 112, first substrate 114 with surface 116, a second substrate 122 with surface 124, optoelectronic device 118 positioned at mount surface 116 and optoelectronic device 120 positioned at surface 124. Multiplexer 110 of FIG. 13 can include a third optoelectronic device 126 positioned to receive an output from optoelectronic device 120. Optoelectronic device 126 is also a detector/filter or a filter.

Detector/filters 48, 62, 110, 118 and 126 detect a signal, pass a portion of that signal, create and transmit a residual signal and reflect all other signals. Filters 48, 62, 110, 118 and 126 pass a portion of a signal, create and transmit a residual signal and reflect all other signals.

Figure 14:
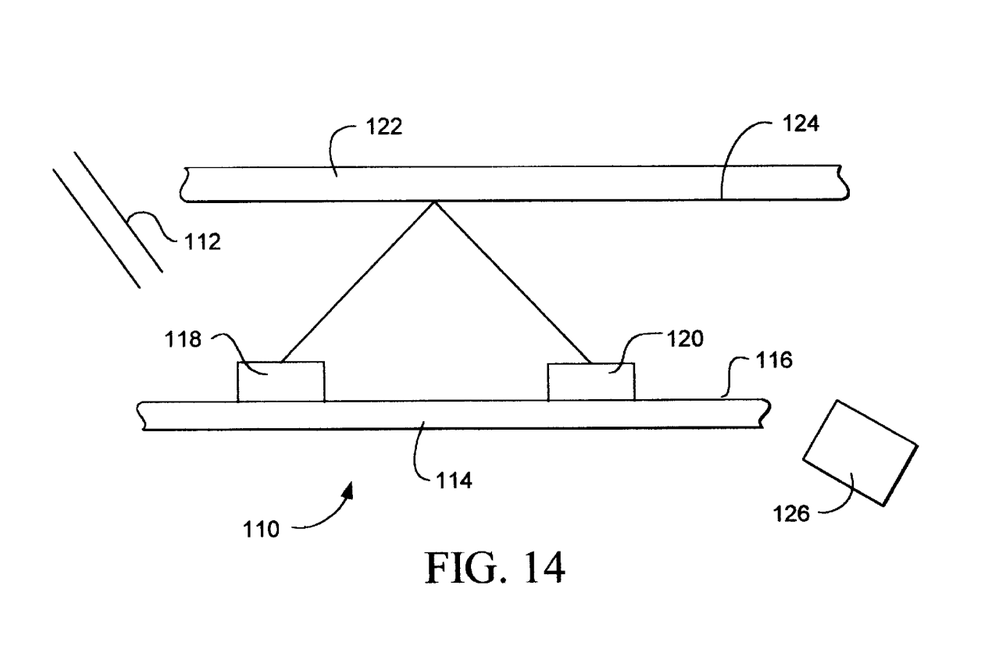
FIG. 14 is a schematic diagram of a multiplex or de-multiplexer of the present invention with an input fiber, a first substrate with a first substrate surface, a second substrate with a reflective surface that faces the first substrate, first and second optoelectronic devices positioned at the surface of the first substrate, and a third optoelectronic device.

As illustrated in FIG. 14, surface 124 can be reflective. A suitable reflective surface 114 can be made by any flat band highly reflective mirror. In one embodiment, reflective surface is a silver glass structure with a level of reflectively that is preferably 95% or greater. Optoelectronic devices 118 and 120 are both positioned at surface 114. The output from optoelectronic device 118 is incident on reflective surface 114 which is then reflected to be incident on optoelectronic device 120. Optoelectronic device 126 can also included and positioned to receive the output from optoelectronic device 120 that is reflected from reflective surface 124. Preferably, optoelectronic devices 118, 120 and 124 are detector/filters or filters.

Figure 15:
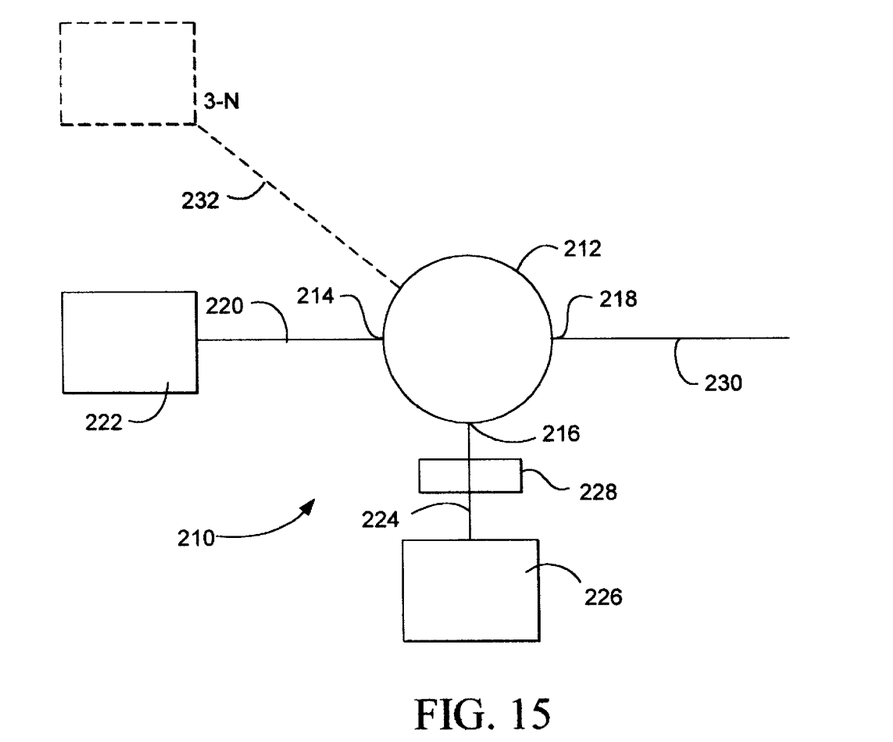
FIG. 15 is a schematic diagram of a multiplexer of the present invention that includes a three port optical circulator, and first and second lasers coupled to the first and second ports.

Another embodiment of a multiplexer 210 is illustrated in FIG. 15. Included are an optical circulator 212 with at least first, second, and third circulator ports 214, 216 and 218 and a first optical transmission path 220 in optical communication with first circulator port 214. A laser 222 produces signal $\lambda_1$ that is transmitted from first optical transmission path 220 to optical circulator 212. A second optical transmission path 224 is in optical communication with second circulator port 216. A laser 226 is coupled to second optical transmission path 224. Laser 226 is reflective of signal $\lambda_1$. Laser 226 need not be reflective if an optional reflective filter 228 is included. Laser 226 adds signal $\lambda_2$. Signals $\lambda_1$ and $\lambda_2$ are transmitted to optical circulator; 212.

A third optical transmission path is in optical communication with third circulator port 218 and transmits signals $\lambda_1$ and $\lambda_2$. Optionally, optical circulator 212 can receive wavelength division multiplexed optical signal including signals $\lambda_3$–$\lambda_n$, from an optical input fiber 232. The signals $\lambda_3$–$\lambda_n$ are reflected by lasers 222 and 226, or filter 216 can be positioned along each optical transmission path 220 and 224, and optical circulator 212 transmits signals $\lambda_1$, $\lambda_2$ and $\lambda_3$–$\lambda_n$, as well as any signals received by the multiplexers and de-multiplexers of FIGS. 2–14. Multiplexer 210 can be coupled directly or indirectly to any of the multiplexers of FIGS. 2–14 and can be used as the multiplexer of FIG. 1.

Figure 16:
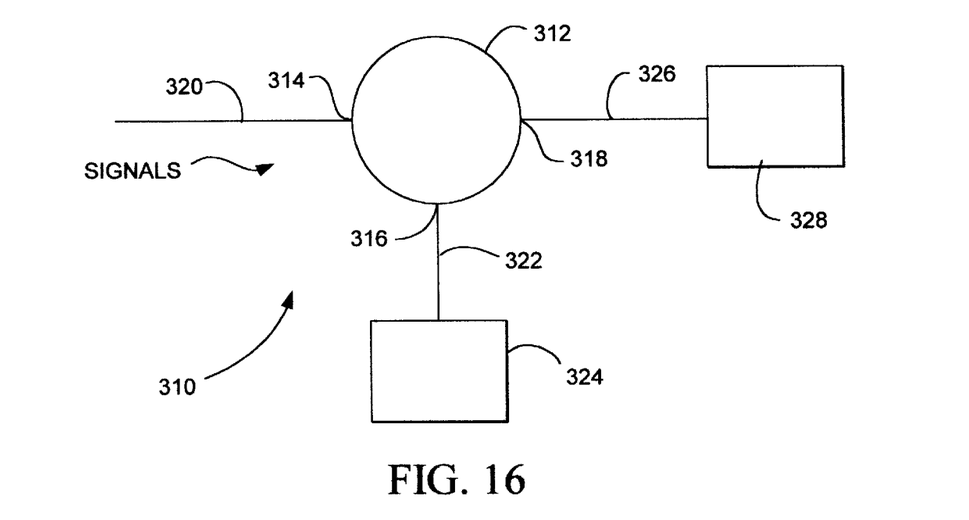
FIG. 16 is a schematic diagram of a de-multiplexer of the present invention that includes a three port optical circulator, with first and second detector/filters and/or filters coupled to the second and third ports.

Another embodiment of a de-multiplexer 310 is illustrated in FIG. 16. An optical circulator 312 includes at least a first, second, and third circulator ports 314, 316 and 318, respectively. An optical fiber with a first optical transmission path 320 is coupled to first circulator port 314 carries a wavelength division multiplexed optical signal including signals $\lambda_1$–$\lambda_n$, or any of the signals transmitted from the multiplexers and de-multiplexers of FIGS. 2–14. A second optical transmission path 322 is in optical communication with second circulator port 316. An optoelectronic device 324 is in optical communication with second optical transmission path 322. Preferably, optoelectronic device 324 is a detector/filter or a filter. A third optical transmission path is in optical communication with third circulator port 318. A second optoelectronic device is in optical communication with third optical transmission path 326. Preferably, optoelectronic devices 324 and 328 are detector/filters or filters. Detector/filters 324 and 328 detect a signal, pass a portion of that signal, create and transmit a residual signal and reflect all other signals. Filters 324 and 328 pass a portion of a signal, create and transmit a residual signal and reflect all other signals. De-multiplexer 310 can be coupled directly or indirectly to any of the multiplexers and de-multipexers of FIGS. 2–14 and can be used as the DWDM sub-system of FIG. 1.

Each of the detector/filters, filters, lasers and bi-lateral amplifiers of FIGS. 1–16 can be tunable, and in one embodiment be programmably tunable. Additionally, the optical fibers used with the DWDM assemblies, sub-assemblies and devices of the present invention can be metrowave fibers (MWF) disclosed in U.S. Pat. No. 5,905,838, incorporated herein by reference. An illustrative specification table for a suitable metrowave fiber is presented:

MWF Specification Table

Attenuation at 1550 nm
<=0.25 dB/km
Attenuation at 1310 nm
<=0.50 dB/km
Effective area at 1550 nm
>=42 microns
Core eccentricity
Less than or equal to 0.8 mu m
Cladding diameter
125+−2.0 microns
Cut-off wavelength
<1250 nm
Zero-dispersion wavelength
1350 nm–1450 nm
Dispersion at 1310 nm
−3.0 to −8 ps/nm-km
Dispersion at 1550 nm
+3.0 to +8 ps/nm-km
Dispersion slope at 1550 nm
0.01–0.05 ps/nm sup 2-km
Macrobendingloss at 1310 nm
<0.5 dB (1 turn, 32 mm)
Macrobending loss at 1550 nm
<0.05 dB (100 turns, 75 mm)
Coating diameter 245+−10 microns
Proof test 100 kpsi
Reel lengths 2.2, 4.4, 6.4, 8.8, 10.8, 12.6, 19.2 km.

EXAMPLE 1

A DWDM sub-system of the present invention is an eight-port optical circulator includes six detector/filters and is initially configured with three drop channels of two detector/filters each. It is later reconfigured programmably to include two drop channels each with three detector/filters. With the reconfiguration there is a reduction in cross-talk.

EXAMPLE 2

An adder includes an optical circulator coupled to first and second lasers. The first and second laser initially produce output signals $\lambda_1$ and $\lambda_2$. The two lasers are then reconfigured programmably to produce signals $\lambda_3$ and $\lambda_4$.

EXAMPLE 3

A DWDM multiplexer includes an optical circulator coupled to nine lasers. The ninth laser is a backup and can be substituted for one of the first eight lasers when one is down. The wavelength relationships are flexible relative to the ports and can altered at any time.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A multiplexer for a wavelength division multiplexed optical communication system, comprising:
    an optical circulator including at least a first, second, third and fourth circulator ports;
    an optical fiber with a first optical transmission path coupled to the first circulator port of the optical circulator and carrying a wavelength division multiplexed optical signal including signals $\lambda_1$–$\lambda_n$ and at least one signal $\lambda_1$ to be dropped by the multiplexer;
    a second optical transmission path in optical communication with the second circulator port;
    a first detector/filter coupled to the second optical transmission path, the first detector/filter detecting the $\lambda_1$ signal and passing a portion of the $\lambda_1$ signal, and reflecting a first residual $\lambda_1$ signal and signals $\lambda_2$–$\lambda_n$ to the optical circulator;
    a third optical transmission path in optical communication with the third circulator port and transmitting the signals $\lambda_2$–$\lambda_n$ received from the optical circulator;
    a fourth optical transmission path in optical communication with the fourth optical circulator port, the fourth optical transmission path being positioned after the second optical transmission path and before the third optical transmission path; and
    a first optoelectronic device coupled to the fourth optical transmission path.

2. The multiplexer of claim 1, wherein the first optoelectronic device is selected from a detector/filter, a filter and a laser.

3. The multiplexer of claim 1, wherein the first optoelectronic device is a second detector/filter that detects the first residual $\lambda_1$ signal, passes the first residual $\lambda_1$ signal and reflects a second residual $\lambda_1$ signal and the signals $\lambda_2$–$\lambda_n$.

4. The multiplexer of claim 1, wherein the first optoelectronic device is a first filter that passes the first residual $\lambda_1$ signal and reflects a second residual $\lambda_1$ signal and the signals $\lambda_2$–$\lambda_n$.

5. The multiplexer of claim 1, wherein the first optoelectronic device is a first laser that reflects the first residual $\lambda_1$ signal and the signals $\lambda_2$–$\lambda_n$ and adds back the $\lambda_1$ signal.

6. The multiplexer of claim 1, wherein the first optoelectronic device is a first laser that reflects the first residual $\lambda_1$ signal and the signals $\lambda_2$–$\lambda_n$ and adds a $\lambda_{n+1}$ signal.

7. The multiplexer of claim 3, further comprising:
    a fifth optical transmission path in optical communication with a fifth optical circulator port, the fifth optical transmission path being positioned after the fourth optical transmission path and before the third optical transmission path; and
    a second optoelectronic device coupled to the fifth optical transmission path.

8. The multiplexer of claim 7, wherein the second optoelectronic device is a third detector/filter that detects the second residual $\lambda_1$ signal, passes the second residual $\lambda_1$ signal and reflects a third residual $\lambda_1$ signal and the signals $\lambda_2$–$\lambda_n$.

9. The multiplexer of claim 7, wherein the second optoelectronic device is a first filter that passes the second residual $\lambda_1$ signal and reflects a third residual $\lambda_1$ signal and the signals $\lambda_2$–$\lambda_n$.

10. The multiplexer of claim 7, wherein the second optoelectronic device is a first laser that reflects the second residual $\lambda_1$ signal and the signals $\lambda_2$–$\lambda_n$ and adds back the $\lambda_1$ signal.

11. The multiplexer of claim 7, wherein the second optoelectronic device is a first laser that reflects the second residual $\lambda_1$ signal and the signals $\lambda_2$–$\lambda_n$ and adds $\lambda_{n+1}$ signal.

12. The multiplexer of claim 4, further comprising:
    a fifth optical transmission path in optical communication with a fifth optical circulator port, the fifth optical transmission path being positioned after the fourth optical transmission path and before the third optical transmission path; and
    a second optoelectronic device coupled to the fifth optical transmission path.

13. The multiplexer of claim 12, wherein the second optoelectronic device is a second detector/filter that detects the second residual $\lambda_1$ signal, passes the second residual $\lambda_1$ signal and reflects a third residual $\lambda_1$ signal and the signals $\lambda_2$–$\lambda_n$.

14. The multiplexer of claim 12, wherein the second optoelectronic device is a second filter that passes the second residual $\lambda_1$ signal and reflects a third residual $\lambda_1$ signal and the signals $\lambda_2$–$\lambda_n$.

15. The multiplexer of claim 12, wherein the second optoelectronic device is a first laser that reflects the second residual $\lambda_1$ signal and the signals $\lambda_2$–$\lambda_n$ and adds back the $\lambda_1$ signal.

16. The multiplexer of claim 12, wherein the second optoelectronic device is a first laser that reflects the second residual $\lambda_1$ signal and the signals $\lambda_2$–$\lambda_n$ and adds a signal $\lambda_{n+1}$.

17. The multiplexer of claim 6, further comprising:
    a fifth optical transmission path in optical communication with a fifth optical circulator port, the fifth optical transmission path being positioned after the fourth optical transmission path and before the third optical transmission path; and
    a second optoelectronic device coupled to the fifth optical transmission path.

18. The multiplexer of claim 17, wherein the second optoelectronic device is a second detector/filter that detects the first residual $\lambda_1$ signal, passes the first residual $\lambda_1$ signal and reflects a second residual $\lambda_1$ signal, the signals $\lambda_2$–$\lambda_n$ and the signal $\lambda_{n+1}$.

19. The multiplexer of claim 17, wherein the second optoelectronic device is a first filter that passes the first residual $\lambda_1$ signal and reflects a second residual $\lambda_1$ signal, the signals $\lambda_2$–$\lambda_n$ and the signal $\lambda_{n+1}$.

20. The multiplexer of claim 17, wherein the second optoelectronic device is a second laser that reflects the first residual $\lambda_1$ signal, the signals $\lambda_2$–$\lambda_n$, the signal $\lambda_{n+1}$ and adds a signal $\lambda_{n+2}$.

21. The multiplexer of claim 8, further comprising:
    a sixth optical transmission path in optical communication with a sixth optical circulator port, the sixth optical transmission path being positioned after the fifth optical transmission path and before the third optical transmission path; and
    a first laser coupled to the sixth optical transmission path, wherein the first laser reflects the third residual $\lambda_1$ signal, the signals $\lambda_2$–$\lambda_n$ and adds back the signal $\lambda_1$.

22. The multiplexer of claim 8, further comprising:
    a sixth optical transmission path in optical communication with a sixth optical circulator port, the sixth optical transmission path being positioned after the fifth optical transmission path and before the third optical transmission path; and
    a first laser coupled to the sixth optical transmission path, wherein the first laser reflects the third residual $\lambda_1$ signal, the signals $\lambda_2$–$\lambda_n$ and adds a signal $\lambda_{n+1}$.

23. The multiplexer of claim 14, further comprising:
    a sixth optical transmission path in optical communication with a sixth optical circulator port, the sixth optical transmission path being positioned after the fifth optical transmission path and before the third optical transmission path; and a first laser coupled to the sixth optical transmission path, wherein the first laser reflects the third residual $\lambda_1$ signal, the signals $\lambda_2$–$\lambda_n$ and adds back the signal $\lambda_1$.

24. The multiplexer of claim 14, further comprising:

a sixth optical transmission path in optical communication with a sixth optical circulator port, the sixth optical transmission path being positioned after the fifth optical transmission path and before the third optical transmission path; and a first laser coupled to the sixth optical transmission path, wherein the first laser reflects the third residual $\lambda_1$ signal, the signals $\lambda_2$–$\lambda_n$ and adds back a signal $\lambda_{1+1}$.

25. The multiplexer of claim 2, wherein the detector/filter, filter, and laser are each tunable.

26. The multiplexer of claim 25, wherein the detector/filter, filter, and laser are each programmably tunable.

27. The multiplexer of claim 1, further comprising:

a bi-directional optical amplifier coupled to the second optical transmission path positioned between first detector/filter and the optical circulator.

28. The multiplexer of claim 1, wherein the first detector/filter is an integral detector and filter device.

29. The multiplexer of claim 1, wherein the first detector/filter includes a non-integral detector and a filter.

30. The multiplexer of claim 1, wherein the $\lambda_1$ signal is any wavelength of the signals $\lambda_1$–$\lambda_n$.

31. A multiplexer for a wavelength division multiplexed optical communication system, comprising:

an optical circulator including at least a first, second, third and fourth circulator ports;

an optical fiber with a first optical transmission path coupled to the first circulator port of the optical circulator and carrying a wavelength division multiplexed optical signal including signals $\lambda_1$–$\lambda_n$ and at least one signal $\lambda_1$ to be dropped by the multiplexer;

a second optical transmission path in optical communication with the second circulator port;

a first filter coupled to the second optical transmission path, the first filter passing a portion of the $\lambda_1$ signal, and reflecting a first residual $\lambda_1$ signal and the signals $\lambda_2$–$\lambda_n$ to the optical circulator;

a third optical transmission path in optical communication with the third circulator port and transmitting the signals $\lambda_2$–$\lambda_n$ received from the optical circulator;

a fourth optical transmission path in optical communication with the fourth optical circulator port, the fourth optical transmission path being positioned after the second optical transmission path and before the third optical transmission path; and a first optoelectronic device coupled to the fourth optical transmission path.

32. The multiplexer of claim 31, wherein the first optoelectronic device is selected from a detector/filter, filter and a laser.

33. The multiplexer of claim 31, wherein the first optoelectronic device is a second filter that passes the first residual $\lambda_1$ signal and reflects a second residual $\lambda_1$ signal and the signals $\lambda_2$–$\lambda_n$.

34. The multiplexer of claim 31, wherein the first optoelectronic device is a first detector/filter that detects and passes the first residual $\lambda_1$ signal and reflects a second residual $\lambda_1$ signal and the signals $\lambda_2$–$\lambda_n$.

35. The multiplexer of claim 31, wherein the first optoelectronic device is a first laser that reflects the first residual $\lambda_1$ signal and the signals $\lambda_2$–$\lambda_n$ and adds back the signal $\lambda_1$.

36. The multiplexer of claim 31, wherein the first optoelectronic device is a first laser that reflects the first residual $\lambda_1$ signal and the signals $\lambda_2$–$\lambda_n$ and adds a signal $\lambda_{n+1}$.

37. The multiplexer of claim 33, further comprising:

a fifth optical transmission path in optical communication with a fifth optical circulator port, the fifth optical transmission path being positioned after the fourth optical transmission path and before the third optical transmission path; and a second optoelectronic device coupled to the fifth optical transmission path.

38. The multiplexer of claim 37, wherein the second optoelectronic device is a first detector/filter that detects and passes the second residual $\lambda_1$ signal, and reflects a third residual $\lambda_1$ signal and the signals $\lambda_2$–$\lambda_n$.

39. The multiplexer of claim 37, wherein the second optoelectronic device is a third filter that passes the second residual $\lambda_1$ signal, and reflects a third residual $\lambda_1$ signal and the signals $\lambda_2$–$\lambda_n$.

40. The multiplexer of claim 37, wherein the second optoelectronic device is a first laser that reflects the second residual $\lambda_1$ signal and the signals $\lambda_2$–$\lambda_n$, and adds back the signal $\lambda_1$.

41. The multiplexer of claim 37, wherein the second optoelectronic device is a first laser that reflects the second residual $\lambda_1$ signal and the signals $\lambda_2$–$\lambda_n$, and adds a signal $\lambda_{n+1}$.

42. The multiplexer of claim 34, further comprising:

a fifth optical transmission path in optical communication with a fifth optical circulator port, the fifth optical transmission path being positioned after the fourth optical transmission path and before the third optical transmission path; and a second optoelectronic device coupled to the fifth optical transmission path.

43. The multiplexer of claim 42, wherein the second optoelectronic device is a second detector/filter that detects and passes the second residual $\lambda_1$ signal, and reflects a third residual $\lambda_1$ signal and the signals $\lambda_2$–$\lambda_n$.

44. The multiplexer of claim 42, wherein the second optoelectronic device is a second filter that passes the second residual $\lambda_1$ signal, and reflects a third residual $\lambda_1$ signal and the signals $\lambda_2$–$\lambda_n$.

45. The multiplexer of claim 42, wherein the second optoelectronic device is a first laser that reflects the second residual $\lambda_1$ signal and the signals $\lambda_2$–$\lambda_n$, and adds back the signal $\lambda_1$.

46. The multiplexer of claim 42, wherein the second optoelectronic device is a first laser that reflects the second residual $\lambda_1$ signal and the signals $\lambda_2$–$\lambda_n$, and adds a signal $\lambda_{n+1}$.

47. The multiplexer of claim 36, further comprising:

a fifth optical transmission path in optical communication with a fifth optical circulator port, the fifth optical transmission path being positioned after the fourth optical transmission path and before the third optical transmission path; and a second optoelectronic device coupled to the fifth optical transmission path.

48. The multiplexer of claim 47, wherein the second optoelectronic device is a first detector/filter that detects and passes the first residual $\lambda_1$ signal, and reflects a second residual $\lambda_1$ signal, the signals $\lambda_2$–$\lambda_n$ and the signal $\lambda_{n+1}$.

49. The multiplexer of claim 47, wherein the second optoelectronic device is a second filter that passes the first residual $\lambda_1$ signal, and reflects a second residual $\lambda_1$ signal, the signals $\lambda_2$–$\lambda_n$ and the signal $\lambda_{n+1}$.

50. The multiplexer of claim 47, wherein the second optoelectronic device is a second laser that reflects the signals $\lambda_2$–$\lambda_n$, the signal $\lambda_{n+1}$ and adds a signal $\lambda_{n+2}$.

51. The multiplexer of claim 31, wherein the detector/filter, filter, and laser are each tunable.

52. The multiplexer of claims 51, wherein the detector/filter, filter, and laser are each programmably tunable.

53. The multiplexer of claim 31, further comprising:
 a bi-directional optical amplifier coupled to the second optical transmission path positioned between first filter and the optical circulator.

* * * * *